United States Patent [19]

Kimura

[11] 4,376,914
[45] Mar. 15, 1983

[54] MOTOR CONTROL DEVICE
[75] Inventor: Kenji Kimura, Hachioji, Japan
[73] Assignee: Olympus Optical Company Ltd., Tokyo, Japan
[21] Appl. No.: 242,239
[22] Filed: Mar. 10, 1981
[30] Foreign Application Priority Data Mar. 11, 1980 [JP] Japan .................................. 55-30592
Mar. 13, 1980 [JP] Japan .................................. 55-32061

[51] Int. Cl.³ .......................................... G05B 19/28
[52] U.S. Cl. .................................... 318/603; 318/318; 318/607
[58] Field of Search ................ 318/603, 607, 606, 318

[56] References Cited
U.S. PATENT DOCUMENTS

| 3,675,107 | 7/1972 | Barber | 318/603 X |
| 3,742,326 | 6/1973 | Okuda et al. | 318/603 |
| 4,023,085 | 5/1977 | Bishop et al. | 318/603 X |
| 4,264,850 | 4/1981 | Cannon et al. | 318/607 X |
| 4,287,461 | 9/1981 | Promis et al. | 318/603 X |

Primary Examiner—B. Dobeck
Attorney, Agent, or Firm—Toren, McGeady and Stanger

[57] ABSTRACT

A motor control device is disclosed. The device comprises an electric motor, a first counter for counting clock signals having a certain frequency, means for resetting the first counter by an output corresponding to a rotational frequency of the motor and storing a counted content of the first counter immediately before the reset, a second counter for counting clock signals having a certain frequency higher than the above clock signal, and means for comparing the content of the first counter with that of the second counter, resetting the second counter by a coincidence of both the contents, generating output signals from the reset the second counter to the reset of the first counter, and controlling a rotational frequency of the motor by the output signals.

3 Claims, 14 Drawing Figures

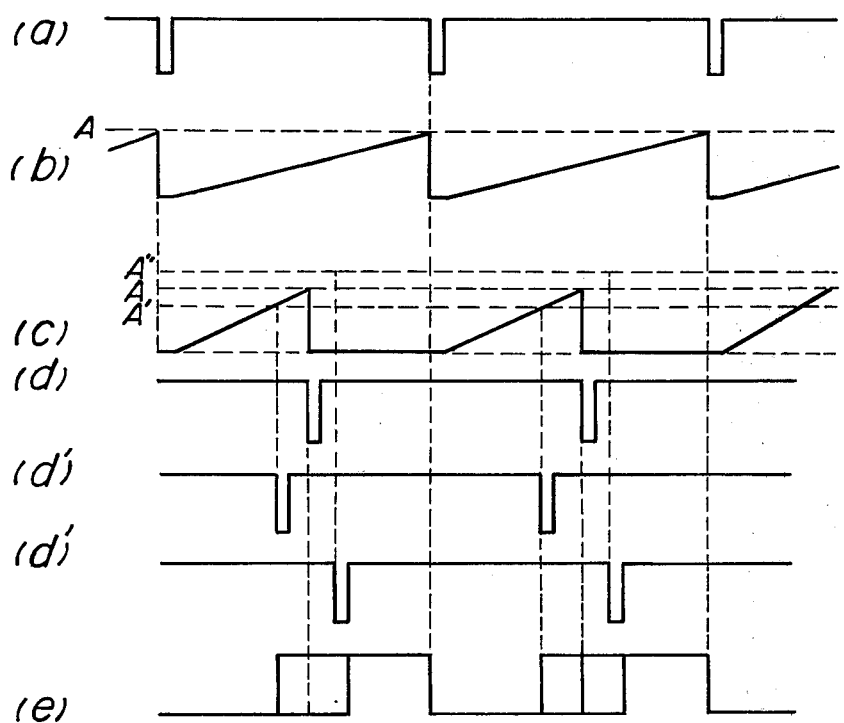
FIG_4
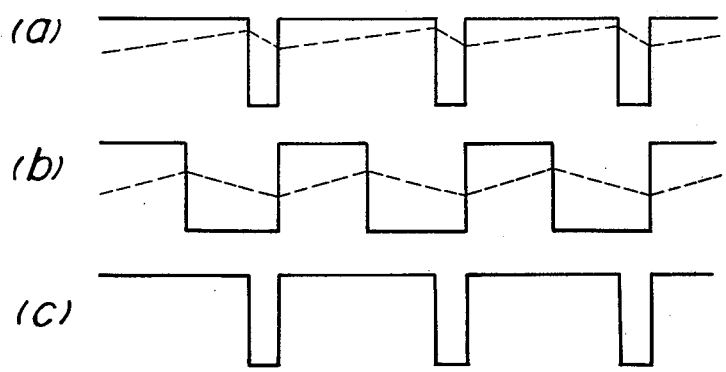
FIG_5

FIG_7
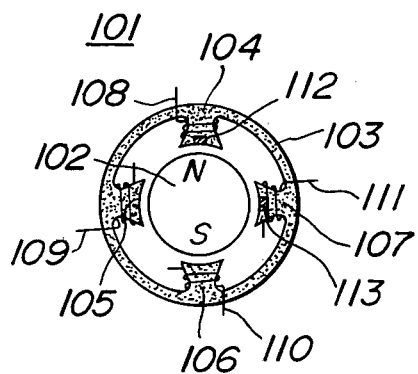
FIG.8
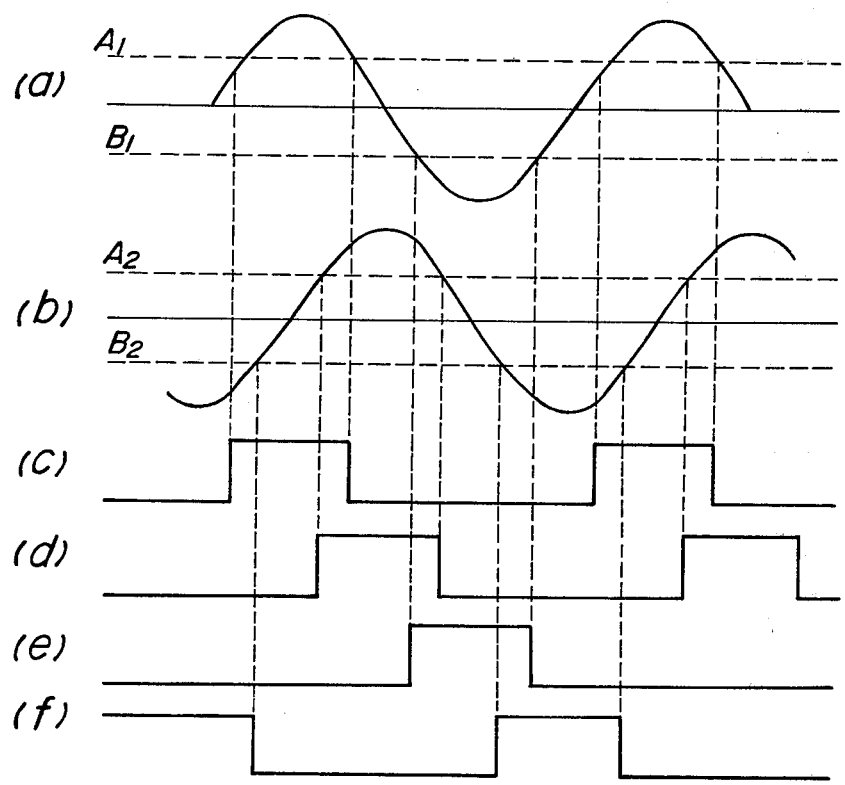

MOTOR CONTROL DEVICE

BACKGROUND OF THE INVENTION

The present invention relates to a motor control device with the use of a digital servo system.

As a control device for a motor such as a D.C. motor or a brushless motor, for example, a Hall motor, use is often made of an analog type servo system, but such analog system has comparatively large power loss in circuit and also comparatively large heat generation caused by the loss, and further has a temperature drift or the like of an operating point, so that it tends to be deteriorated in stability.

SUMMARY OF THE INVENTION

An object of the present invention is to eliminate the above described disadventages of the conventional motor control device.

Another object of the present invention is to provide a motor control device for obtaining extremely stable control with the use of a digital servo system.

According to the present invention there is provided a motor control device comprising an electric motor, a first counter for counting clock signals having a certain frequency, means for resetting the first counter by an output corresponding to a rotational frequency of the motor and storing a counted content of the first counter immediately before the reset, a second counter for counting clock signals having a certain frequency higher than the above clock signal, and means for comparing the content of the first counter with that of the second counter, resetting the second counter by a coincedence of both the contents, generating output signals from the reset of the second counter to the reset of the first counter, and controlling a rotatinal frequency of the motor by the output signals. A frequency of clock signals of the second counter is made variable.

According to the present invention there is also provided a motor control device comprising a brushless motor, means for generating rotational signals corresponding to the pole number of the motor, a first counter for counting clock signals having a certain frequency, means for reseting the first counter by the rotational signal and storing the counted content of the first counter immediately before the reset, a second counter for counting clock signals having a certain frequency, and means for comparing the stored content with the content of the second counter, resetting the second counter by a coincedence of both the contents and modulating a start time of a current supplied to each pole winding of the motor by an output generated by the coincedence. The means for generating rotational signals corresponding to the pole number of the motor converts a sine wave detected by a magneto-electronic converter element provided to the motor into a rotatinal signal corresponding to the pole number of the motor through a predetermined slice level. A frequency of clock signals counted in the first counter is set approximately ½ the frequency of clock signals counted in the second counter.

BRIEF DESCRIPTION OF THE DRAWING

FIGS. 3 to 5 are waveforms for explaining the operations of various circuit of the device shown in FIG. 1;

FIG. 7 is a schematic diagram showing a construction of a Hall motor used in the device shown in FIG. 6;

FIGS. 8 to 13 are waveforms for explaining the operations of various circuits of the device shown in FIG. 6.

DESCRIPTION OF THE PREFERRED EMBODIMENT

Figure 1:
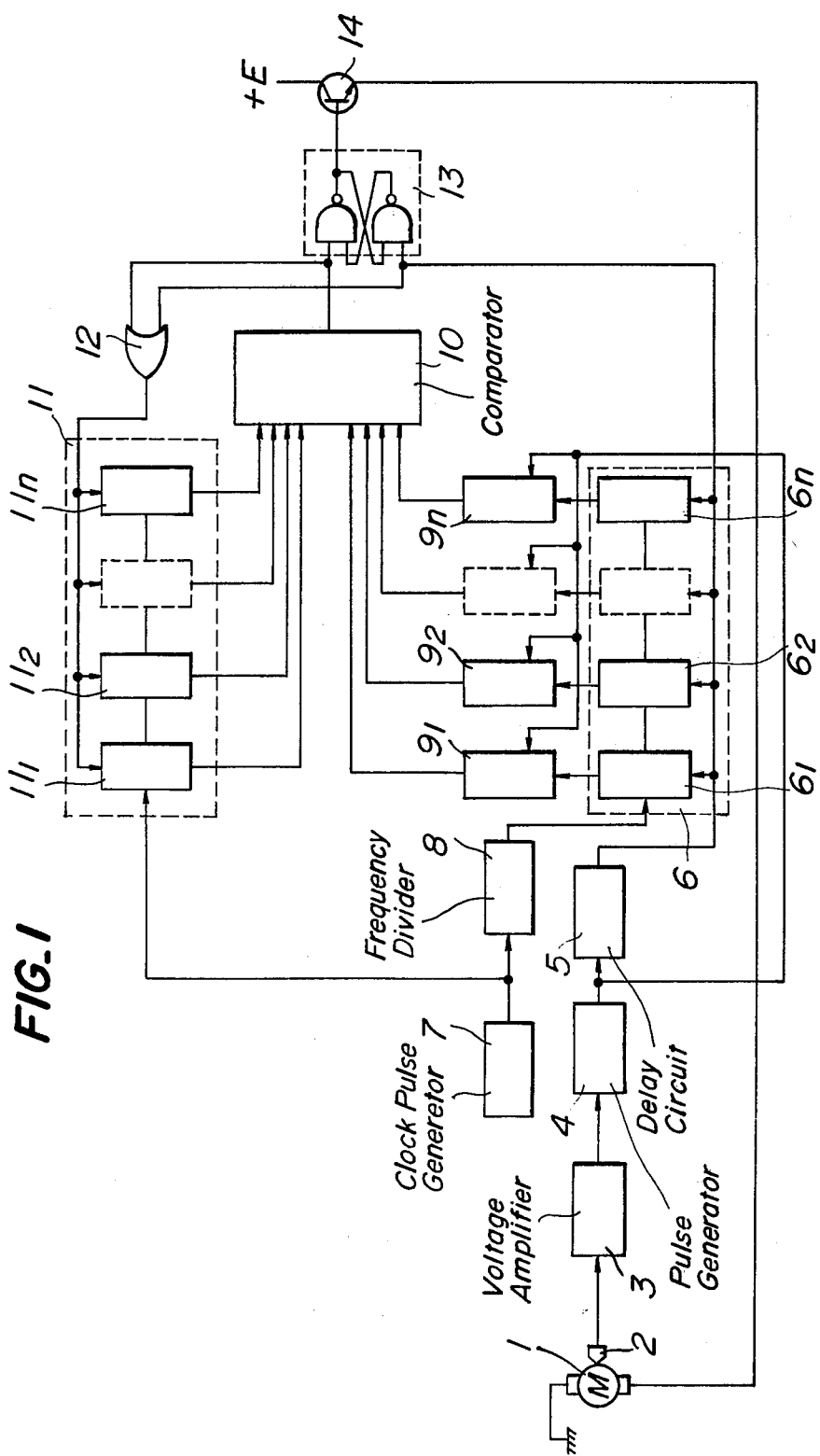
FIG. 1 is a block diagram showing a construction of one embodiment of a motor control device according to the present invention.

Referring now to the drawings, wherein same reference characters designate same or corresponding parts throughout the several views, FIG. 1 shows an embodiment of a motor control device according to the present invention.

In FIG. 1, reference numeral 1 is a motor, for example, a D.C. motor, and the motor 1 is provided with a rotation sensor 2. The rotation sensor 2 is used for detecting a rotational frequency of the motor 1. In this case, in the present embodiment, a photo-coupler (photoelectric transducer element) is used as the rotation sensor 2, and generates 38 pulse outputs per rotation of the motor 1.

The rotation sensor 2 is connected to a pulse generator 4 through a voltage amplifier 3.

The pulse generator 4 is composed of a differentiation circuit consisting of a capacitor and a resistor.

Figure 2:
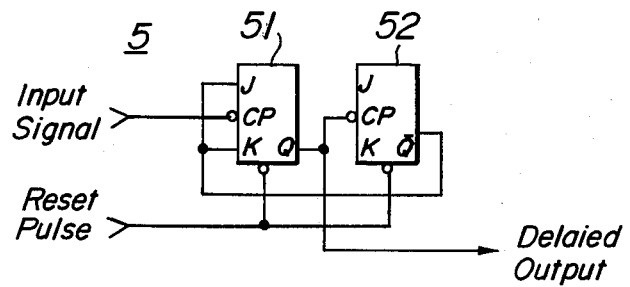
FIG. 2 is a block diagram showing a dely circuit used in the device shown in FIG. 1.

The pulse generator 4 is connected to a delay circuit 5. The delay circuit 5 comprises, as shown in FIG. 2, two stages of J*K flip-flops $5_1$, $5_2$, and a Q output of the flip-flop $5_2$ of the latter stage is fedback to a J*K input of the flip-flop $5_1$ of the former stage, so as to generate as a reset output a delayed output as shown in FIG. 3a to the output of the pulse generator 4 as shown in FIG. 3c. The delay circuit 5 is connected to a counter 6. The counter 6 consists of N bit, i.e., N number of flip-flop $6_1$, $6_2$, ... $6_n$ and rests output levels of each flip-flop $6_1$, $6_2$, ... $6_n$ to "0" by the reset output of the delay circuit 5. Moreover, the counter 6 is also connected to a clock signal generator 7 through a frequency divider 8. The frequency divider 8 divides the frequency of clock signals about ½. The clock signal generator 7 generates clock signals having a predetermind frequency.

Each flip-flop $6_1$, $6_2$, ... $6_n$ of the counter 6 is connected to latch circuits $9_1$, $9_2$, ... $9_n$. These latch circuits $9_1$, $9_2$, ... $9_n$ are connected to the pulse generator 4, so as to store the content of the counter 6 by the output of the pulse generator 4.

The latch circuits $9_1$, $9_2$, ... $9_n$ are connected to one set of input terminals of a comparator 10. The comparator 10 has the other set of input terminals connected to a counter 11, compares the data or content of the counter 11 with the data of the latch circuits $9_1$, $9_2$, ... $9_n$, and generates a "0" output when both the data are equal. In this case, the counter 11 consists of N number of flip-flops $11_1$, $11_2$, ... $11_n$ in the same manner as the counter 6 and counts the output of the clock signal generator 7. Moreover, the counter 11 is connected to output terminals of the delay circuit 5 and the comparator 10 through an OR circuit 12, so as to reset the output levels of each flip-flop $11_1$, $11_2$, ... $11_n$ to "0" by the reset output of the delay circuit 5 or the "0" output of the comparator 10.

The comparator 10 is connected to a set terminal of an R-S flip-flop 13, and an output terminal of the flip-flop 13 is connected to a base of a transistor 14. The flip-flop 13 has a reset terminal connected to the output terminal of the delay circuit 5.

The transistor 14 has a collector connected to an electric power source +E and an emitter connected to the motor 1.

The operation of the device constructed as described above will be explained.

Figure 3:
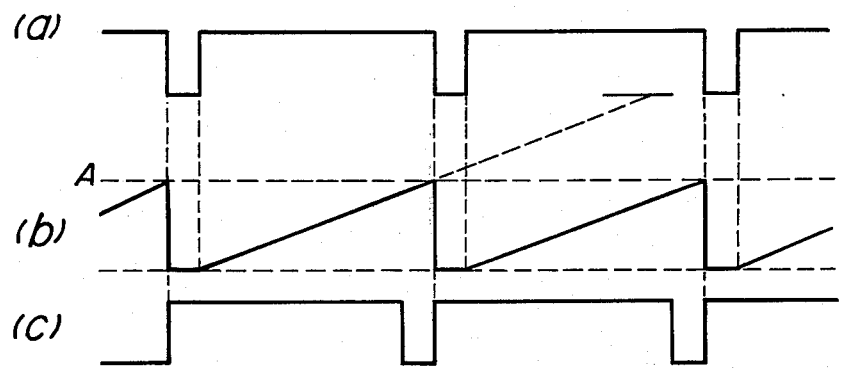

When output pulses in accordance with the rotational frequency of the motor 1 are now generated from the rotation sensor 2, these output pulses are amplified by the voltage amplifier 3 and supplied to the pulse generator 4. The output of the pulse generator 4 is also supplied to the counter 6 through the delay circuit 5. In this case, clock signals of the clock signal generator 7 are supplied to the counter 6 by dividing it into ½ by the frequency divider 8, so that the counter 6 is once reset by the reset output of the delay circuit 5, counts the output of the frequency divider 8, and then reset by the reset output of the delay circuit 5 and thereafter repeats the same action. This state is shown in FIG. 3. That is, FIG. 3a shows the reset output of the delay circuit 5 and FIG. 3b shows the counted content of the counter 6 in the form of analog.

The counter 6 repeats the counting action as described above, but in this case, the counted content immediately before reset, i.e., the count level shown by A in FIG. 3, changes by a change of the rotational frequency of the motor, i.e., the period of the reset pulse, because of a constant output frequency of the frequency divider 8.

The counted content of said counter 6 is also supplied to the latch circuit $9_1, 9_2, \ldots 9_n$ as a data input and is stored in these latch circuits $9_1, 9_2, \ldots 9_n$ by every output of the pulse generator 4. In this case, the output of the pulse generator 4, as shown in FIG. 3c, is in forward condition to the reset output shown in FIG. 3a, so that the counted content immediately before the reset of the counter 6 is stored in the latch circuits $9_1, 9_2, \ldots 9_n$.

The stored data of the latch circuits $9_1, 9_2, \ldots 9_n$ are supplied to one set of input terminals of the comparator 10. The other set of input terminals of the comparator 10 receives output data of the counter 11. The counter 11 is reset simultaneously with the counter 6 by the reset output of the delay circuit 5 and directly counts the output of the clock signal generator 7, so that when the counted content of the counter 11 is coincident with that of the latch circuits $9_1, 9_2, \ldots 9_n$, the "0" output is generated from the comparator 10. However, the counter 11 is immediately reset through the OR circuit 12 by the output of the comparator 10, so that the output of the comparator 10 becomes "1". Then, the flip-flop 13 is set, and is thereafter, reset by the reset output of the delay circuit 5. This state is shown in FIG. 4. That is, FIG. 4a shows a reset output of the delay circuit 5, FIG. 4b shows a counted content of the counter 6 in the form of analog, FIG. 4c shows a counted content of the counter 11 in the form of analog, FIG. 4d shows an output of the comparator 10, and FIG. 4e shows an output of the flip-flop 13. In this case, A shows a count level of the above-described counter 6. This count level A changes according to the rotational frequency of the motor 1. In case of a low frequency, the count level a becomes A', and in case of a high frequency, it becomes A". Thus, when the rotational frequency of the motor 1 is low, if the counted content of the counter 11 becomes the level A', the output shown in FIG. 4d' is generated from the comparator 10, and when the rotational frequency becomes high, if the counted content of the counter 11 becomes the level A", the output shown in FIG. 4d" is generated from the comparator 10. That is, phases of the output of the comparator 10 change by a change of the rotational frequency of the motor 1 as shown in FIGS. 4d, 4d' and 4d", so as to modulate the leading edge of the output of the flip-flop 13 shown in FIG. 4e in accordance with the rotational frequency of the motor 1, so that symmetry of the output pulses of the flip-flop 13 is modulated. The output of the flip-flop 13 is current-amplified by the transistor 14 and supplied as a driving signal to the motor 1. As shown in FIGS. 5a, 5b and 5c, by a change of symmetry of said driving signal, a mean current value flowed into the motor 1 is changed and then the rotational frequency of the motor 1 is changed. The rotational frequency of the motor 1 is, therefore, controlled, but the above-described control system forms a negative feedback loop, so that the rotational frequency of the motor 1 is automatically pulled in the vicinity of the level A shown in FIG. 4.

In addition, fine adjustment of the rotational frequency of the motor 1 is possible by changing the clock frequency of the clock signal generator 7. Moreover, gain adjustment of the loop system is possible by properly selecting the bit number (stage number) of the counter 6 and the bit number (stage number) of the counter 11.

Another embodiment of the motor control device according to the present invention will be described with reference to FIG. 6. In this embodiment the motor is a brudhless motor.

Figure 6:
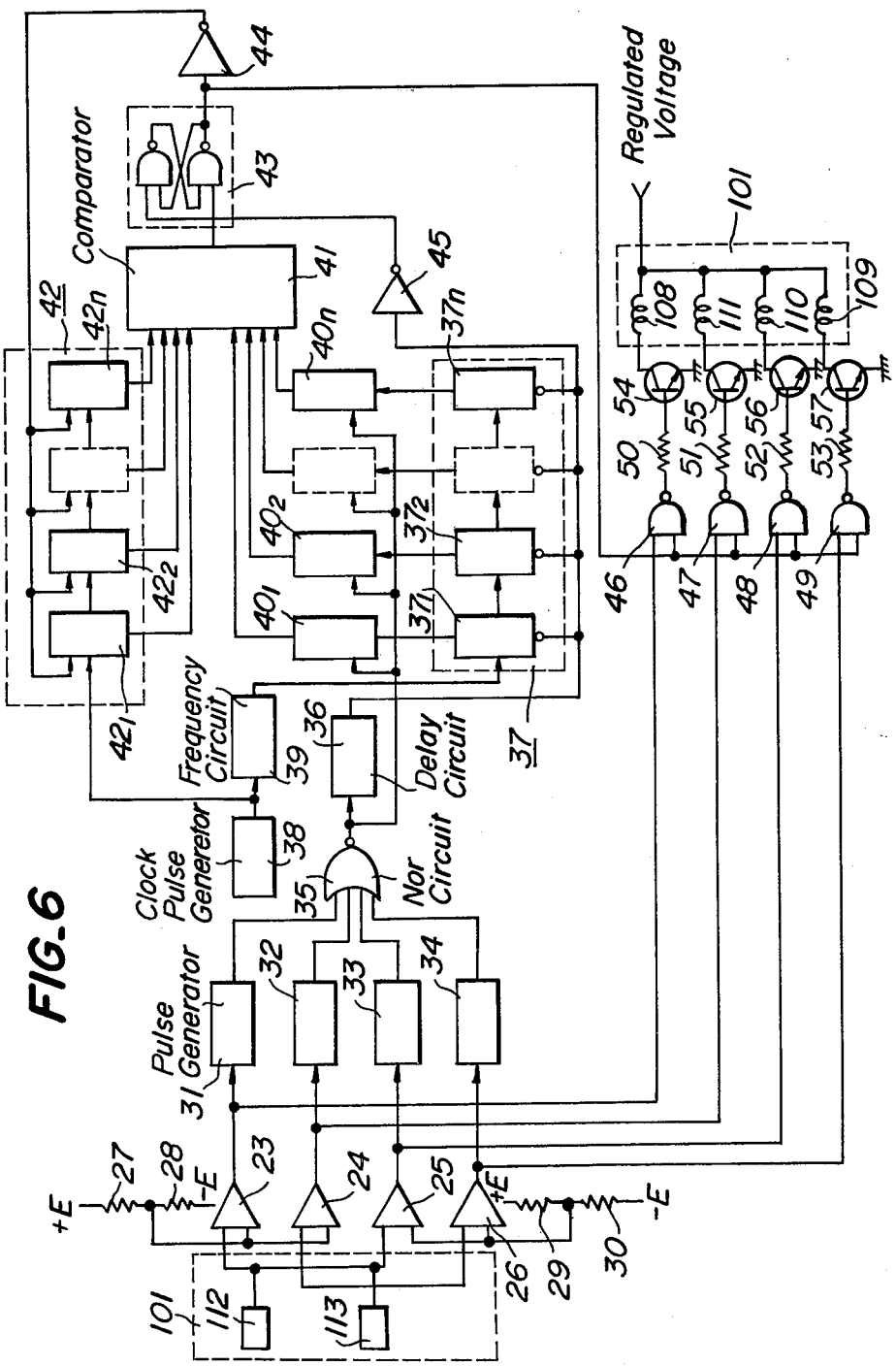
FIG. 6 is a block diagram showing a construction of another embodiment of a motor control device according to the present invention.

In FIG. 6, reference nymeral 101 is a brushless motor, for example, Hall motor. The Hall motor 101 has a rotor 102 formed by a magnet as shown in FIG. 7 and a stator 103 corresponding thereto. The stator 103 is provided with phases 104, 105, 106 and 107 of four poles, and these phases are wound with winding 108, 109, 110 and 110, respectively. The phases corresponding to a phase at 90° around a rotation axis of the rotor 102, such as the phases 104 and 107 in the illustrated example, are provided with electromagnetic transducer elements, such as Hall elements 112 and 113.

The Hall elements 112 and 113 are used to generate a signal for detecting rotational position of the rotor 102, and are DC-biased to make an output voltage 0 V in direct current when placed in the intermediate pole position of the 102, i.e., in the intermediate position between a pole N and a pole S, and to generate a signal having a sine wave-like amplitude in positive and negative directions around 0 V as the rotor 102 rotates.

An output signal of the Hall element 112 is supplied to one input of voltage comparators 23 and 25, while an output signal of the Hall element 113 is supplied to one input of voltage comparators 24 and 26, respectively. The voltage comparators 23 and 24 have the other input which receives a voltage divided by resistors 27 and 28, and the voltage comparators 25 and 26 have the other input which receives a voltage divided by resistors 29 and 30.

These voltage comparators 23, 24, 25, and 26 compose the so-called slicer, the voltage comparators 23 and 24 set a slice level on the positive side formed by dividing voltages +E and −E by the resistors 27 and 28, while the voltage comparators 24 and 25 set a slice level on the negative side formed by dividing voltages +E and −E by the resistors 29 and 30.

This condition will be explained with reference to FIG. 8. FIG. 8a shows an output voltage of the Hall element 112, and FIG. 8b shows an output voltage of the Hall element 113. In addition, $A_1$ is a slice level on the positive side set in the voltage comparator 23, $A_2$ is a slice level on the positive side set in the voltage comparator 24 $B_1$ is a slice level on the negative side set in the voltage comparator 25, and $B_2$ is a slice level on the negative side set in the voltage comparator 26.

When respective output voltages of the Hall elements 112 and 113 exceed the slice levels $A_1$, $B_1$ and $A_2$, $B_2$, four phase positive pulses which phases are successively delayed are generated as shown in FIGS. 8c to 8f.

The pulse output generated from the voltage comparators 23, 24, 25 and 26 are supplied to the pulse generators 31, 32, 33 and 34, respectively, so as to trigger these pulse generators 31, 32, 33 and 34. The trigger point in this case is a leading point of the output pulse shown in FIGS. 3c to 3f. The pulse generators 31, 32, 33 and 34 comprise a fifferential amplifier having resistor, capacitor and transistor, respectively. The pulse generators 31, 32 33 and 34 generate a pulse output having a sufficiently small pulse width (e.g., about 1 $\mu$sec), respectively, and this output is supplied to a NOR circuit 35.

Figure 9:
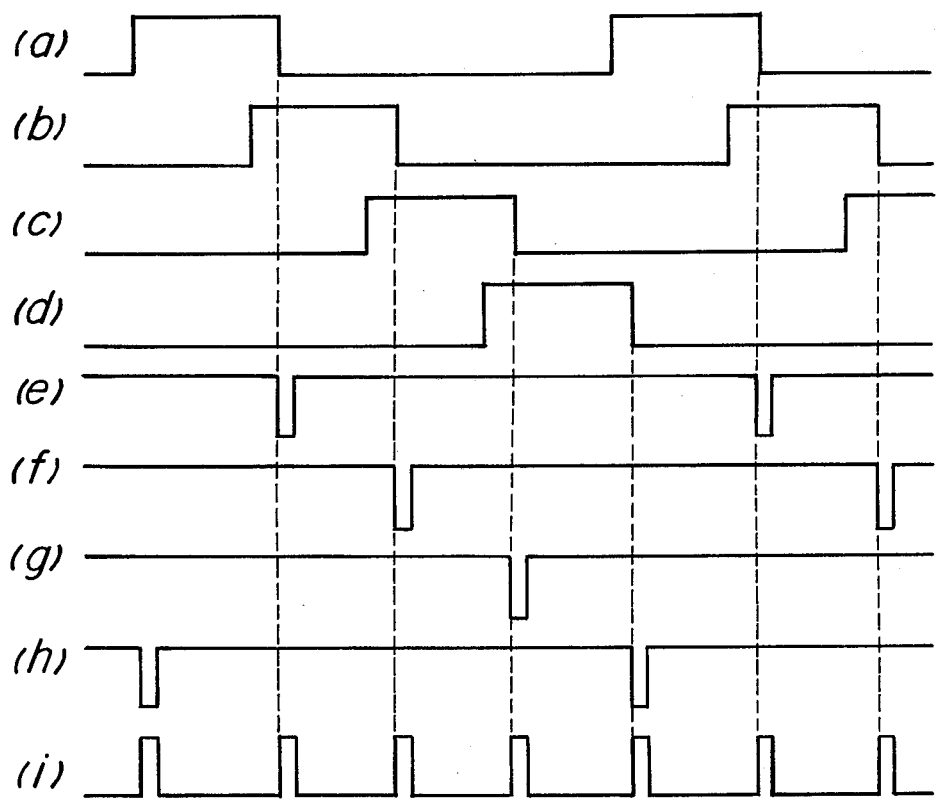

This condition is shown in FIG. 9. That is, FIGS. 9a to 9d show output pulses of the voltage comparators 23,24,25 and 26, FIGS. 9e to 9h show output pulses of the pulse generators 31, 32, 33 and 34, and FIG. 9i shows an output pulse of the NOR circuit 35. The output pulse of the NOR circuit 35 in this case is synchronized with a leading or trailing point of each phase.

The output pulse of the NOR circuit 35 is delayed by a delay circuit 36 and supplied as a reset output to a counter 37. The delay circuit 36 uses a delay line of a lumped constant type, and a delay time is not overlapped with the output pulse of the NOR circuit 35. The counter 37 has N bit, i.e., N step of flip-flops $37_1$, $37_2$ . . . $37_n$, is reset by the reset output of the above delay circuit 36, and down-counts clock signals of a clock signal generator 38 supplied through a frequency divider 39. In this case, the clock signal generator 38 comprises a crystal oscillator so as to generate clock signals of about 2 MHz, and the frequency divider 39 divides a frequency of this clock signal to about ½. (This frequency divider 39 is not neccessarily used.)

Figure 10:
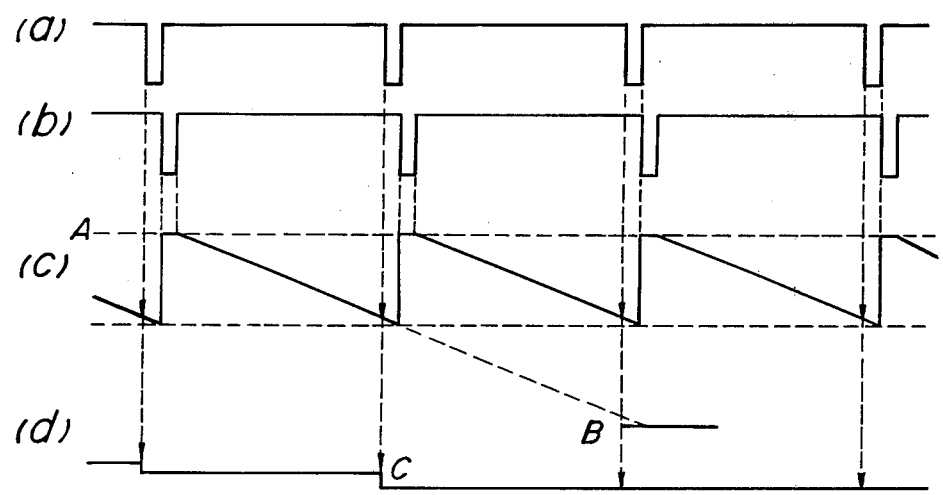

This state is shown in FIG. 10. That is, FIG. 10a shows an output pulse of the NOR circuit 35, FIG. 10b shows a delayed output of the delay circuit 36, and FIG. 10c shows a counted content of the counter 37 in the form of analog.

The counter 37, thus, repeats its counting action, and in this case, the counted content immediately before reset, that is, the count level shown by A in FIG. 10, changes by the change of a period of the reset pulse, i.e., a rotational frequency of the motor 101, since an output frequency of the frequency divider 39 is constant.

An output of the counter 37 is supplied to one input of latch circuits $40_1$, $40_2$, . . . $40_n$ and written therein by timing of output pulses of the NOR circuit 35. In this case, the output of the NOR circuit 35, as shown in FIG. 10a, proceeds to the reset output as shown in FIG. 10b, so that the counted content immediately before reset of the counter 37 is written in the latch circuits $40_1$, $40_2$, . . . $40_n$. This state is shown in FIG. 10d. That is FIG. 10d shows the stored content of the latch circuits $40_1$, $40_2$, . . . $40_n$ in the form of analog, but if the rotational frequency of the motor 101 is rapidly fluctuated, the stored data are also changed as shown in FIG. 10c. It is a matter of course that the data up to that time are erased simultaneously with the writting of the data. In FIG. 10, a level B shows the count saturation point of the counter 37. If a period of the reset pulse is prolonged, it reaches the level B, but the operational level is usually used in a region of ½ of the level B.

The stored content of the latch circuit $40_1$, $40_2$, . . . $40_n$ is supplied to one set of inputs of a comparator 41. This comparator 41 has the other set of inputs to which an output data of a counter 42 is supplied. The counter 42 has N bit, i.e., N stage of flip-flops $42_1$, $42_2$, . . . $42_n$, and directly counts clock signals of the clock signal generator 38 as being reset by the output of an inverter 44 which will be explained later on.

The comparator 41 generates an output when the latched content of the latch circuit $40_1$, $40_2$, . . . $40_n$ is coincident with the counted content of the counter 40, and changes the output level from "1" to "0" for example. The output of this comparator 41 resets a R-S flip-flop 43. The flip-flop 43 receives the output of the NOR circuit 35 as a preset input through an inverter 45.

Figure 11:
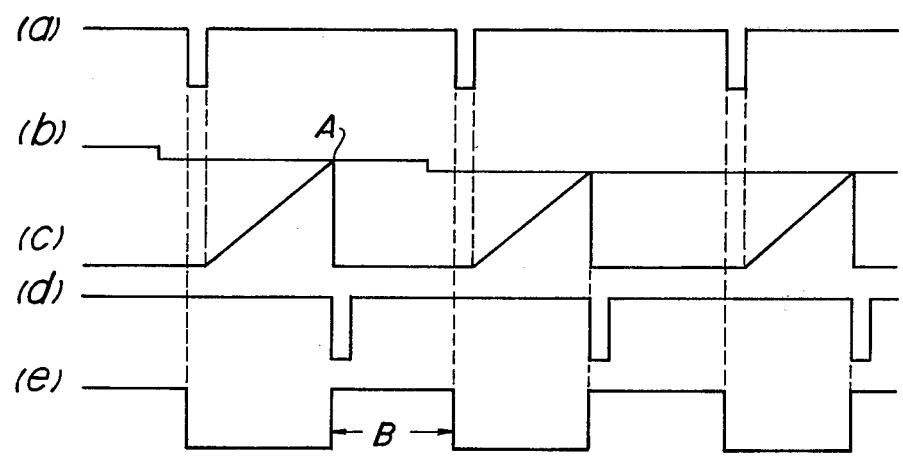

This action is further explained with reference to FIG. 11 in detail. FIG. 11c shows a counted content of counter 42 in the form of analog. In this case, the frequency of clock signals to be counted is twice the output frequency of the frequency divider 39 counted by the counter 37, so that the counting inclination becomes twice as compared with that shown in FIG. 10c. When the counted content of the counter 37 becomes equal to the output data of the latch circuits $40_1$, $40_2$, . . . $40_n$ at the point A in FIG. 11b, an output shown in FIG. 11d is generated from the comparator 41, and by this output the R-S flip-flop 43 is reset. The output of this flip-flop 43 is reversed by the inverter 44 so as to reset the counter 37. Moreover, the flip-flop 43 is preset by the output of the inverter 45 shown in FIG. 11a.

With the above operation, the leading edge of the output pulse of the R-S flip-flop 43 is phase-modulated by fluctuation of the rotational frequency of the motor 101, and the pulse width B is changed as shown in FIG. 11e.

Figure 12:
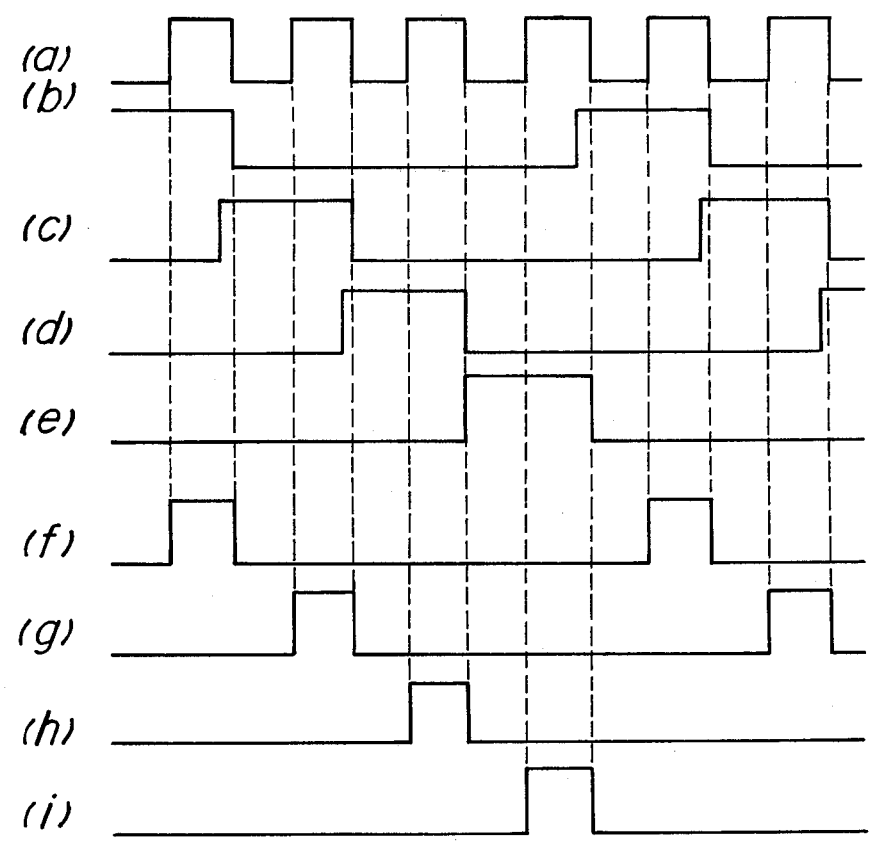

The output of the R-S flip-flop 43 is supplied as a NAND input to NAND circuits 46, 47, 48 and 49. The other input of the NAND circuits 46, 47, 48 and 49 receives a 4-phase pulse formed by the voltage comparators 23, 24, 25 and 26, so that the output of the NAND circuits 46, 47, 48 and 49 generates the output signal of the R-S flip-flop 43 corresponding to timing of each phases, respectively. This state is shown in FIG. 12. That is, FIG. 12a shows an output pulse of the R-S flip-flop 43, FIGS. 12b to 12e show output pulses of the voltage comparators 23,24,25 and 26, and FIGS. 12f to 12i show output pulses of the NAND circuits 46, 47, 48 and 49.

Each output pulse of the NAND circuits 46, 47, 48, and 49 is supplied to bases of the transistors 54, 55, 56 and 57 through the resistors 50, 51, 52 and 53.

The cut-off state of each transistor 44, 45, 46, 47 is therefor controlled, a current is supplied to each winding 108, 109, 110, 111 of the motor 101, and the rotational frequency thereof is controlled.

Figure 14:
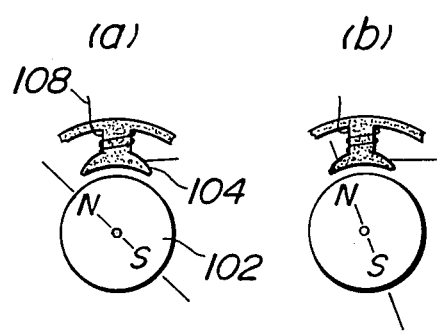
FIG. 14 is a schematic diagram for explaining the operation of the Hall motor shown in FIG. 7.

The supply start time of the current supplied to each winding 108, 109, 110, 111 of the motor 101 may be changed to change the rotational frequency of the notor 101, which is explained with reference to FIG. 14. Now, in case of a quick supply start time, at the position of the rotor 102 shown in FIG. 14a, the current is supplied to the winding 108 on the side of the stator 103 to obtain a rotating force, but if the supply start time is delayed, unless the rotor 102 is not close to the winding 108 as shown in FIG. 14b, the current is not supplied. It means that the rotating or driving torque becomes small under a certain load, and thus, the rotational frequency is also lowered.

Figure 13:
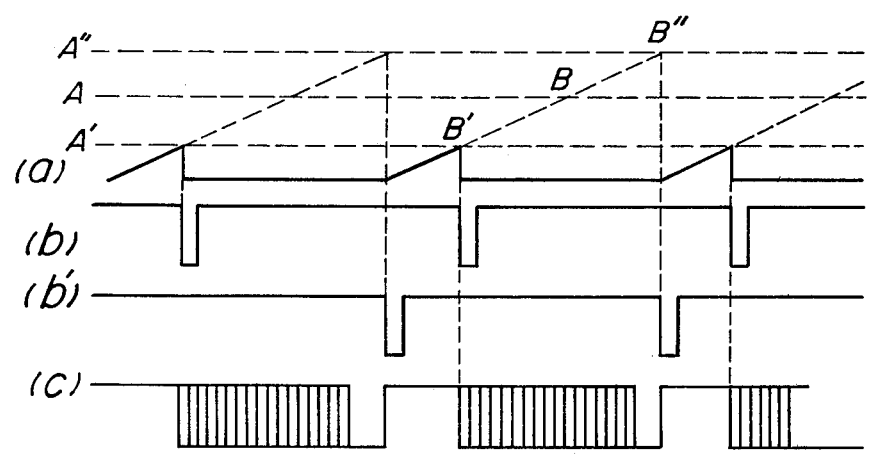

In addition, the operating waveforms of each part due to the change of the rotational frequency of the motor 101 is explained with reference to FIG. 13. At the low speed of the motor 101, if the latch output of the latch circuits $40_1, 40_2, \ldots 40_n$ is A', the counted content of the counter 42 shown in FIG. 13a is coincident with the latch output A' at the point B', so that the comparator 41 generates the output shown in FIG. 13b. If the motor 101 is at a high speed, the latch output becomes A'', so that the counted content of the counter 42 is coincident with the latch output A2 at the point B'', and the output shown in FIG. 13b' is generated from the comparator 41. Thus, the output of the R-S flip-flop 43, to which the output of the comparator 41 is supplied, in phase-modulated by fluctuation of the rotational frequency of the motor 101 at the leading edge of a pulse as shown in FIG. 13c. Therefore, when the rotational frequency of the motor is low, it is raised, while the rotational frequency of the motor is high, it is lowered, so that the counted content is finally pulled in the operating point B in coincidance with the level A shown in FIG. 13.

The gain of a negative feedback loop is inversely proportional to the bit member (stage member) of the counter 37, but the more the value of the bit number N, the more the resolution improves, and the smaller the value, the lower the resolution, and the compensating ability of a slight jitter lowers. This is applied to the clock frequency, too. Moreover, in order to hold the counted content of the counter 42 at the operating point B of FIG. 13, as in the above embodiment, it is necessary to provide the frequency divider 39 for making the clock frequency counted by the counter 37 the value $\frac{1}{2}$ or close to that value of the clock frequency counted by the counter 44.

Therefore, according to the present invention, the rotational frequency of the motor can be controlled by a digital signal treatment, so as to sufficiently minimize the loss due to the circuit and heat generation due to the loss as compared with the prior analog system, to obtain an extremely stable control having no temperature drift of the operating point which is seen in the analog system, and to design the LSI suitable.

In addition, the present invention is not limited to the above embodiment but can be modified without departing from the scope of the invention.

What is claimed is:

1. A motor control device comprising an electric motor, a first counter for counting clock signals having a certain frequency, means for resetting the first counter by an output corresponding to a rotational frequency of the motor and storing a counted content of the first counter immediately before the reset, a second counter for counting clock signals having a certain frequency higher than the above clock signal, and means for comparing the content of the first counter with that of the second counter, resetting the second counter by a coincidence of both the contents, generating output signals from the reset of the second counter to the reset of the first counter, and controlling a rotational frequency of the motor by the output signals.

2. A motor control device as claimed in claim 1, wherein a frequency of clock signals of the second counter is made variable.

3. A motor control device as claimed in claim 1, wherein the electric motor is a D.C. motor.

* * * * *